(12) United States Patent
Azose

(10) Patent No.: US 9,656,123 B2
(45) Date of Patent: May 23, 2017

(54) RECOMMENDED MODES OF TRANSPORTATION FOR ACHIEVING FITNESS GOALS

(71) Applicant: Google Inc., Mountain View, CA (US)

(72) Inventor: Benjamin Albert Azose, Menlo Park, CA (US)

(73) Assignee: Google Inc., Mountain View, CA (US)

(*) Notice: Subject to any disclaimer, the term of this patent is extended or adjusted under 35 U.S.C. 154(b) by 52 days.

(21) Appl. No.: 14/683,905

(22) Filed: Apr. 10, 2015

(65) Prior Publication Data

US 2015/0209616 A1   Jul. 30, 2015

Related U.S. Application Data

(63) Continuation of application No. 14/052,217, filed on Oct. 11, 2013, now Pat. No. 9,053,509.

(60) Provisional application No. 61/871,745, filed on Aug. 29, 2013.

(51) Int. Cl.
G06Q 30/06 (2012.01)
A63B 24/00 (2006.01)
G06Q 50/30 (2012.01)

(52) U.S. Cl.
CPC ..... *A63B 24/0075* (2013.01); *G06Q 30/0631* (2013.01); *G06Q 50/30* (2013.01)

(58) Field of Classification Search
CPC .................................................. G01C 21/34
USPC ....................................................... 701/410
See application file for complete search history.

(56) References Cited

U.S. PATENT DOCUMENTS

| 7,534,206 | B1 | 5/2009 | Lovitt et al. |
| 8,478,606 | B2 | 7/2013 | Bodlaender et al. |
| 8,610,582 | B2 | 12/2013 | Jeon et al. |
| 2008/0162186 | A1 | 7/2008 | Jones |
| 2010/0305984 | A1 | 12/2010 | Ben-Yitschak et al. |
| 2011/0054779 | A1 | 3/2011 | Kim et al. |
| 2012/0010809 | A1 | 1/2012 | Stut et al. |
| 2012/0274508 | A1 | 11/2012 | Brown et al. |
| 2013/0106684 | A1* | 5/2013 | Weast ................ G06F 19/3481 345/156 |

(Continued)

FOREIGN PATENT DOCUMENTS

| JP | H10148539 A | 6/1998 |
| JP | 2004109100 A | 4/2004 |
| JP | 2012113516 A | 6/2012 |

OTHER PUBLICATIONS

International Search Report and Written Opinion of International Application PCT/US2014/044361, mailed Mar. 18, 2015 12 pp.

(Continued)

*Primary Examiner* — Mila Airapetian
(74) *Attorney, Agent, or Firm* — Shumaker & Sieffert, P.A.

(57) ABSTRACT

A computing system is described that determines one or more of modes of transportation available to a user of a computing device to travel from a current location of the computing device to a particular destination such that the user is predicted to arrive at the particular destination by a particular future time. The computing system determines, based at least in part on a fitness goal associated with the user of the computing device, a recommended mode of transportation from the one or more modes of transportation, the recommended mode of transportation being a particular mode of transportation predicted to aid the user in achieving the fitness goal. The computing system outputs, for transmission to the computing device, an indication of the recommended mode of transportation.

20 Claims, 5 Drawing Sheets

(56) References Cited

U.S. PATENT DOCUMENTS

| | | | | |
|---|---|---|---|---|
| 2014/0074392 A1* | 3/2014 | Holm | ................ | G01C 21/3415 |
| | | | | 701/400 |
| 2014/0143784 A1* | 5/2014 | Mistry | ................ | G06F 15/0208 |
| | | | | 718/102 |
| 2014/0303892 A1* | 10/2014 | Morlock | ................ | G01C 21/20 |
| | | | | 701/533 |
| 2015/0066683 A1 | 3/2015 | Azose | | |

OTHER PUBLICATIONS

"Apps by Kickstand Technology LLC," Google play [online]. First Accessed on Jun. 28, 2013. Retrieved from the Internet: <https://play.google.com/store/apps/developer?id=Kickstand+Technology+LLC&hl=en> 1 pg.

JCP Innovations "Cycle Weather," Google play [online]. Apr. 2, 2013. Retrieved from the Internet: <https://play.google.com/store/apps/details?id=com.CycleWeather&hl=en> 2 pgs.

"endomondo," endomondo [online]. First Accessed on Jun. 28, 2013. Retrieved from the Internet: <http://www.endomondo.com/about> 3 pgs.

"Moves—App," Moves [online]. First Accessed on Jun. 20, 2013. Retrieved from the Internet: <http://www.moves-app.com/> 3 pgs.

"The 64 Best Health and Fitness Apps of 2013," Greatist [online]. Mar. 27, 2013. Retrieved from the Internet: <http://greatist.com/health/best-health-fitness-apps> 36 pgs.

Prosecution History from U.S. Appl. No. 14/052,217 from Feb. 4, 2014 through Feb. 11, 2015 52 pp.

International Preliminary Report on Patentability from International Application No. PCT/US2014/044361, mailed Mar. 10, 2016, 8 pp.

* cited by examiner

RECOMMENDED MODES OF TRANSPORTATION FOR ACHIEVING FITNESS GOALS

This application is a Continuation of application Ser. No. 14/052,217, filed Oct. 11, 2013, which claims the benefit of U.S. Provisional Application No. 61/871,745, filed Aug. 29, 2013, the entire contents of each of which are hereby incorporated by reference.

BACKGROUND

A mobile computing device (e.g., a mobile phone, tablet computer, etc.) may offer a variety of features and functionality. For example, when traveling, a user may employ such a mobile computing device to keep track of time, to navigate, and/or to search for information relevant to a current trip and/or destination. As another example, when working to achieve a fitness goal, a user may employ a mobile computing device to log and/or track information related to physical activity and/or physiological parameters of the user to help the user assess his or her performance relative to the fitness goal.

SUMMARY

In one example, the disclosure is directed to a method that includes determining, by a computing system, one or more of modes of transportation available to a user of a computing device to travel from a current location of the computing device to a particular destination such that the user is predicted to arrive at the particular destination by a particular future time. The method further includes determining, by the computing system and based at least in part on a fitness goal associated with the user of the computing device, a recommended mode of transportation from the one or more modes of transportation, the recommended mode of transportation being a particular mode of transportation predicted to aid the user in achieving the fitness goal. The method further includes outputting, by the computing system, for transmission to the computing device, an indication of the recommended mode of transportation.

In one example, the disclosure is directed to a computing system that includes at least one processor and at least one module operable by the at least one processor to determine one or more of modes of transportation available to a user of a computing device to travel from a current location of the computing device to a particular destination such that the user is predicted to arrive at the particular destination by a particular future time. The at least one module is further operable by the at least one processor to determine based at least in part on a fitness goal associated with the user of the computing device, a recommended mode of transportation from the one or more modes of transportation, the recommended mode of transportation being a particular mode of transportation predicted to aid the user in achieving the fitness goal. The at least one module is further operable by the at least one processor to output, for transmission to the computing device, an indication of the recommended mode of transportation.

In one example, the disclosure is directed to a method that includes receiving, by a computing device, an indication of a fitness goal of a user of the computing device, and sending, by the computing device, to a computing system, an indication of a current location of the computing device and the fitness goal associated with the user of the computing device. Responsive to sending the indication of the current location of the computing device and the fitness goal associated with the user of the computing device, the method further includes receiving, by the computing device, from the computing system, an indication of a recommended mode of transportation, the recommended mode of transportation being a particular mode of transportation available to the user of the computing device to travel from the current location of the computing device to a particular destination such that the user is predicted to arrive at the particular destination by a particular future time, and wherein the recommended mode of transportation is predicted to aid the user of the computing device in achieving the fitness goal. The method further includes outputting, by the computing device and for display, an indication of the recommended mode of transportation.

The details of one or more examples are set forth in the accompanying drawings and the description below. Other features, objects, and advantages of the disclosure will be apparent from the description and drawings, and from the claims.

DETAILED DESCRIPTION

Figure 1:
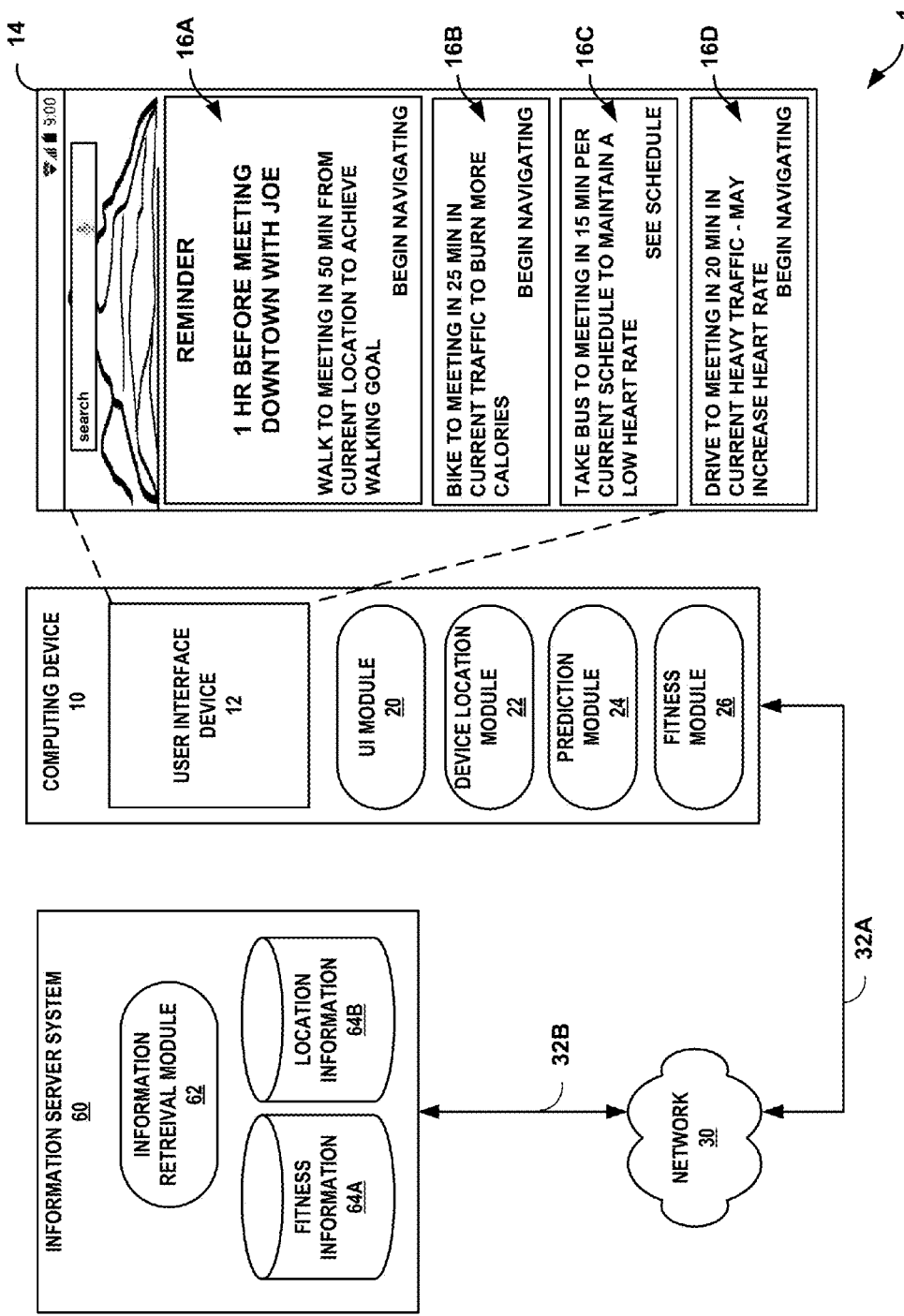
FIG. 1 is a conceptual diagram illustrating an example computing system configured to determine a recommended mode of transportation based on a fitness goal, in accordance with one or more aspects of the present disclosure.

In general, techniques of this disclosure may enable a computing system to determine a fitness goal of a user of a computing device and, based on the fitness goal, determine one or more recommended modes of transportation available to the user of the computing device to both travel to a destination and aid the user in achieving the fitness goal. For example, the computing system may be configured to determine one or more of modes of transportation available to a user of a computing device to travel from a current location of the computing device to a destination (e.g., the location of a meeting entry in a calendar associated with the user) such that the user arrives at the destination by a future time (e.g., prior to the start of the meeting). The computing system may determine, based at least in part on a fitness goal associated with the user of the computing device, one or more recommended modes of transportation from the one or more available modes of transportation. The one or more recommended modes of transportation, in some examples, may be modes of transportation that the computing system predicts will aid the user in achieving the fitness goal. For instance, the computing system may recommend a bicycle as a recommended mode of transportation available to the user to travel to the destination instead of an automobile based on a determination by the computing system that a sufficient amount of time exists for the user of the computing device to ride a bicycle to the destination to arrive at the destination prior to the future time and further based on a determination by the computing system that the user will burn more calories riding a bicycle to the destination than the user will burn by driving an automobile to the destination. Throughout the disclosure, the term fitness goal is used to describe both a minimum amount of physical activity or exercise that a user of a computing device may be working to achieve and also a fitness "cap" or maximum amount of physical activity or exercise that a user of the computing device may be working to achieve.

The computing system may provide the recommended mode of transportation to the computing device that, in turn, may output an indication of the recommended mode of transportation for display in a graphical user interface. Moreover, the computing system may perform these operations automatically without, for example, requiring such operations be initiated by the user thereby reducing the amount of user input, effort, and time required to obtain the information.

Throughout the disclosure, examples are described wherein a computing device may analyze information (e.g., locations, speeds, etc.) associated with the computing device and information (e.g., communications, calendars, etc.) associated with the user of the computing device only if the computing device and/or the computing system receives explicit permission from the user of the computing device to analyze the information. For example, in situations discussed below in which the computing device and/or computing system may collect or may make use of information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

FIG. 1 is a conceptual diagram illustrating an example computing system configured to output information related to recommended mode of transportation for transmission to a computing device. Computing system 1 of FIG. 1 is an example computing system that includes computing device 10, information server system 60, and network 30.

Network 30 represents any public or private communication network, for instance, a cellular, Wi-Fi, and/or other type of network for transmitting data between computing devices. Computing device 10 and information server system 60 may send and receive data across network 30 using any suitable communication techniques. For example, computing device 10 may be operatively coupled to network 66 using network link 32A. Information server system 60 may be operatively coupled to network 30 by network link 32B. Network 30 may include network hubs, network switches, network routers, etc., that are operatively inter-coupled thereby providing for the exchange of information between computing device 10 and information server system 60. In some examples, network links 32A and 32B may be Ethernet, ATM or other network connections. Such connections may be wireless and/or wired connections.

Information server system 60 represents any suitable remote computing system, such as one or more desktop computers, laptop computers, mainframes, servers, cloud computing systems, etc. capable of sending and receiving information across network link 32B to network 30. In some examples, information server system 60 represents a cloud computing system that provides one or more services through network 30. One or more computing devices, such as computing device 10, may access the one or more services provided by the cloud using information server system 30. For example, computing device 10 may store and/or access data in the cloud using information server system 60.

Information server system 60 includes information retrieval module 62, fitness information data store 64A and location information data store 64B. Information retrieval module 62 may perform operations described using software, hardware, firmware, or a mixture of hardware, software, and firmware residing in and/or executing at Information server system 60. Information server system 60 may execute information retrieval module 62 with multiple processors or multiple devices. Information server system 60 may execute information retrieval module 62 as a virtual machine executing on underlying hardware. Information retrieval module 62 may execute as a service of an operating system or computing platform. Information retrieval module 62 may execute as one or more executable programs at an application layer of a computing platform. Information server system 60 may provide access to the data stored at data stores 64A and 64B as a cloud based data access service to devices connected to network 30, such as computing device 10.

Data stores 64A and 64B represent any suitable storage medium for storing data related to fitness and navigation. For example, fitness information data store 64A may store information related to one or more types of physical activities or exercises (e.g., bicycling, walking, running, jogging, canoeing, kayaking, roller skating, etc.) that a person may perform to move between geographic locations. For example, fitness information data store 64A may store fitness information about bicycle riding, such as an average amount of energy expended by a person per unit of distance traveled while the person rides a bicycle. Other examples of fitness information may include weather information (e.g., temperature, humidity, etc.) indicative of a stated and/or predicted preferred weather condition that a person prefers while walking.

The fitness information stored at data store 64A may be generic information associated with an average person or may be specific information associated with particular person, such as a user of computing device 10. For example, information server system 60 may store information related to one or more fitness goals associated with a user of computing device 10. In general, the term "fitness information" refers to any information that information server system 60 and information retrieval module 62 may use to determine a mode of transportation predicted to aid a person in achieving a fitness goal. Examples of fitness goals include a maximum or minimum heart rate level, a body weight, a quantity of footsteps taken by a person over a time duration, a distance traveled over a time duration, an amount of time spent by a person performing a physical activity or exercise, etc.

The fitness information may be organized within data store 64A according to physical activity or exercise type, individual person's names, etc. Information server system 60 may access the data within data store 64A, for instance, by executing a query command related to a particular physical activity and in response to the query command, obtaining information from data store 64A related to the particular physical activity. Information server system 60 may use the information retrieved from data store 64A to determine whether or not to recommend the particular physical activity as a recommended mode of transportation available to a user of computing device 10 to aid the user in achieving a fitness goal.

Data store 64B may store location information such as, digital maps, navigation durations, navigation directions, traffic information at or near a location, past/current/future weather information at or near a location, and the like. The location information may be organized within data store 64B according to various transportation modes, geographic locations, times of day, etc. Information server system 60 may access the data within data store 64B, for instance, by executing a query command related to a particular mode of transportation and responsive to the query command, obtain information about the particular mode of transportation. Information server system 60 may use the information retrieved from data store 64B to determine whether or not the particular mode of transportation is an available mode of transportation for a user of computing device 10 to travel between a current location of computing device 10 and a destination (e.g., a geographic locations that is different from the current location).

Information retrieval module 62 may perform functions for responding to information requests related to the data stored in data stores 64A and 64B and other data stored remote to information server system 60 (e.g., data on the Internet). For instance, information retrieval module 62 may receive a request from computing device 10 via network link 32B for one or more modes of transportation available to a user to travel between geographic locations. Information retrieval module 62 may access data within data store 64B and/or data on the Internet or otherwise stored remotely to information server system 60 to provide information in response to the request by sending the information to computing device 10, via network link 32B and through network 30. Information retrieval module 62 may provide additional information related to each available mode of transportation, such as information related to weather or traffic conditions along an expected travel route of each available mode of transportation, estimated travel durations, estimated travel distances, etc.

In the example of FIG. 1, computing device 10 is a mobile computing device. However, in other examples, computing device 10 may be a tablet computer, a personal digital assistant (PDA), a laptop computer, a portable gaming device, a portable media player, an e-book reader, a watch, a television platform, an automobile navigation system, a wearable computing device (e.g., a headset, eyewear, a glove, etc.), or other type of computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 10.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface (e.g., user interface 14), which may be associated with functionality provided by computing device 10. For example, UID 12 may present various user interfaces of components of a computing platform, operating system, applications, or services executing at or accessible by computing device 10 (e.g., an electronic message application, a navigation application, an Internet browser application, a mobile operating system, etc.). A user may interact with a respective user interface to cause computing device 10 to perform operations relating to a function.

UID 12 of computing device 10 may detect two-dimensional and/or three-dimensional gestures as input from a user of computing device 10. For instance, a sensor of UID 12 may detect a user's movement (e.g., moving a hand, an arm, a pen, a stylus, etc.) within a threshold distance of the sensor of UID 12. UID 12 may determine a two or three dimensional vector representation of the movement and correlate the vector representation to a gesture input (e.g., a handwave, a pinch, a clap, a pen stroke, etc.) that has multiple dimensions. In other words, UID 12 can detect a multi-dimension gesture without requiring the user to gesture at or near a screen or surface at which UID 12 outputs information for display. Instead, UID 12 can detect a multi-dimensional gesture performed at or near a sensor which may or may not be located near the screen or surface at which UID 12 outputs information for display.

Computing device 10 may include user interface ("UI") module 20, device location module 22, prediction module 24, and fitness module 26. Modules 20, 22, 24, and 26 may perform operations described using software, hardware, firmware, or a mixture of hardware, software, and firmware residing in and/or executing at computing device 10. Computing device 10 may execute modules 20, 22, 24, and 26 with one or more processors. Computing device 10 may execute modules 20, 22, 24, and 26 as a virtual machine executing on underlying hardware. Modules 20, 22, 24, and 26 may execute as a service or component of an operating system or computing platform. Modules 20, 22, 24, and 26 may execute as one or more executable programs at an application layer of a computing platform.

UI module 20 may cause UID 12 to present user interface 14. User interface 14 includes graphical indications (e.g., elements) displayed at various locations of UID 12. FIG. 1 illustrates information cards 16A-D (collectively, "cards 16") as one example graphical indication within user interface 14. As described in more detail below, cards 16 may include information that is related to fitness and navigation and that is identified based on a context (e.g., time and location data) of computing device 10. UI module 20 may receive the information from fitness module 26, for instance, in response to computing device 10 determining that the user would like fitness and navigation information (e.g., because a current time coincides with a departure time that a user of computing device 10 is predicted to need to begin traveling to arrive at a destination by a future time). UI module 20 may update user interface 14 with cards 16 to include information and may cause UID 12 to output, for display, cards 16 within user interface 14.

Device location module 22 may determine a current location of computing device 10 and a current time. For example, computing device 10 may include a global positioning system (GPS) radio for receiving GPS signals (e.g., from a GPS satellite) having data corresponding to the current time and the current location of computing device 10. Device location module 22 may analyze the GPS signals received by the GPS radio and determine the current location of computing device 10 and the current time. Computing device 10 may include other radios or sensor devices (e.g., cellular radio, Wi-Fi radio, etc.) capable of receiving signal data, which device location module 22 can use to determine the current location of computing device 10 and the current time.

In some examples, device location module 22 may determine a relative location and/or perform location multilateration to determine a current location (e.g., a technique for determining a single location based on relative position data received from two or more signals). In some examples, device location module 22 may determine location data as coordinate (e.g., GPS) location data. In other examples, device location module 22 may determine location data as one or more general or relative locations, such as an address, a place, a country, a city, a type of building (e.g., a library, an airport, etc.), a business, etc.

In some examples, device location module 22 may obtain the current location of computing device 10 and/or the current time from information server system 60 via network 30. In response to location information that indicates an approximate location of computing device 10 (e.g., within one square mile) received from device location module 22, information server system 60 may send information indicative of a more accurate approximation of the current location of computing device 10 (e.g., within one square meter) to device location module 22. Device location module 22 may output location and time data to other modules of computing device 10, such as prediction module 24.

As used throughout this disclosure, the phrase "current location" refers to a location at a particular time. In various instances, computing device 10 may have physically moved to a different geographic location between the time at which the current location was first determined and the present moment. Even so, the "current location" of computing device 10 is determined to be the location at which the device was physically located at the moment that the location was last determined. The same "current location" may be used throughout the prediction process even though updated current locations may be determined during the prediction process. In general, a "current location" of computing device 10 may be any location within a threshold distance (e.g., 1 meter, 5 meters, 10 meters, 100 meters, 500 meters, etc.) surrounding the determined current location. Similarly, the phrase "current time" refers to a particular time at which computing device 10 determined the "current time" and may be the same time used throughout the prediction process even though the literal current time may change by fractions of a second, a second, or some other amount during the prediction process.

Device location module 22 may also detect movement associated with computing device 10, such as a current speed, acceleration, and/or direction of computing device 10. In detecting movement and determining the current speed, acceleration, or direction of computing device 10, device location module 22 may utilize compass and/or GPS data and/or a series of geographic locations and corresponding times. Based on the locations and times, device location module 22 may determine a distance traveled during a particular duration of time, thereby determining an average speed of computing device 10 during the particular duration of time. Device location module 22 may automatically, or upon request, share information related to the movement of computing device 10 with fitness module 26 and/or prediction module 24.

Fitness module 26 of computing device 10 may collect, analyze, and otherwise maintain fitness information associated with a user of computing device 10. For example, fitness module 26 may maintain information related to one or more fitness goals associated with the user of computing device 10, one or more physical activities or exercises performed by the user of computing device 10, etc. Fitness module 26 may output fitness information that fitness module 26 collects over network 30 to information server system 60 to store the fitness information at data store 64A. Fitness module 26 may retrieve or obtain fitness information stored at data store 64A in response to a request sent over network 30 to information retrieval module 62. In some examples, fitness module 26 may output the fitness information for display at a user interface (e.g., user interface 14). Fitness module 26 may provide access to fitness information to prediction module 24 and/or information server system 60.

The information received by fitness module 26 may be provided explicitly (e.g., from a user through user interaction with fitness module 26 and a user interface displayed at UID 12). Alternatively, or additionally, the information received by fitness module 26 may be implicitly provided (e.g., by detecting movement of computing device 10) through movement of computing device 10 detected as the user performs one or more physical activities or exercises while carrying computing device 10.

A user may provide explicit input to computing device 10, at a user interface displayed at UID 12, to provide an indication of a fitness goal associated with the user, one or more preferred physical activities or exercises associated with the user, or to manually input information indicative of progress that the user has made towards achieving a fitness goal (e.g., distance traveled, time spent performing an activity, etc.). Fitness module 26 may receive the explicit input from the user and based on the explicit input, determine a fitness goal, one or more preferred activities associated with the user, and/or track progress towards achieving a fitness goal.

A user may implicitly provide input to computing device 10 that provides an indication to fitness module 26 of a fitness goal associated with the user, one or more preferred physical activities or exercises associated with the user, or progress that the user has made towards achieving a fitness goal. For example, after receiving permission from the user, fitness module 26 may implicitly obtain fitness information by monitoring activity associated with the user of computing device 10. A user of computing device 10 may enable a setting on computing device 10 that allows fitness module 26 to detect movement associated with computing device 10 and use the detected movement to determine when the user of computing device 10 performs one or more physical activities or exercises. Based on the implicit input, fitness module 26 may determine a fitness goal, one or more preferred activities associated with the user, and/or track the user's progress towards achieving a fitness goal.

In some examples, fitness module 26 may receive information that indicates movement of computing device 10 (e.g., the current speed, direction, acceleration, etc.) from device location module 22 and determine that user of computing device is likely performing a physical activity or exercise (e.g., walking, jogging, riding a bicycle, etc.). In some examples, fitness module 26 may determine that a user of computing device 10 is performing a physical activity or exercise in response to determining that the speed of computing device 10 satisfies a threshold speed indicative of that physical activity or exercise.

Fitness module 26 may track progress made by a user towards achieving a fitness goal. For example, fitness module 26 may store data as one or more metrics (e.g., times, distances, durations, steps, percentage, energy expended, physiologic parameters associated with the user, etc.) that indicate different measures of progress towards achieving a fitness goal. In some examples, fitness module 26 may track an amount of time that a user of computing device 10 spends during a time duration performing the physical activity or exercise to track progress towards a fitness goal associated with the user. Fitness module 26 may receive sensor information over time from various internal or external sensors of computing device 10 that indicate the user's weight, heart rate, body temperature, etc. and track progress towards a fitness goal associated with the user based on the sensor information.

While the computing system may proactively provide fitness and navigation information based (at least in part) on the current location of the computing device and fitness information of a user of the computing system, the computing system may receive the current location information and the fitness information associated with the user only if the computing system receives explicit permission from the user of the computing device to analyze the information. For example, in situations discussed herein in which the computing device and/or the computing system may collect or may make use of personal information about the user, the user may be provided with an opportunity to control whether programs or features of the computing system and/or the computing device can collect user information (e.g., information about a user's e-mail, a user's social network, a user's social actions or activities, a user's calendar, a user's profession, a user's preferences, or a user's current location), or to control whether and/or how the computing system and/or the computing device may receive content that may be relevant to the user. In addition, certain data may be treated in one or more ways before it is stored or used by the computing system and/or the computing device, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing system and/or the computing device.

Prediction module 24 may predict, based on information obtained from information retrieval module 62, device location module 22, and fitness module 26, whether a user of computing device 10 would like to receive fitness and navigation information. For example, prediction module 24 may have access to communications (e.g., calendars stored at computing device 10, e-mail and text-based messages received at computing device 10, social networking information accessed with computing device 10, etc.) of a user of computing device 10 and from the communications, prediction module 24 may identify information about a destination (e.g., a location of a meeting, appointment, travel waypoint, event, attraction, or activity) which the user may need to arrive at by a future time.

Prediction module 24 may provide reminders about future destinations and future times obtained from the communications. For instance, when the current time of day is within a threshold time of the future time, prediction module 24 may provide a reminder or notification (e.g., similar to cards 16 of user interface 14) to alert the user about the event occurring at the destination and may further provide an indication of one or more modes of transportation available to the user to arrive at the destination by the future time.

Prediction module 24 may provide one or more recommended modes of transportation out of the available transportation modes to help the user in achieving a fitness goal. For example, prediction module 24 may request and obtain navigation information from information retrieval module 62 related to one or more of modes of transportation available to the user of computing device 10 to travel from a current location of computing device 10 to a particular destination such that the user is predicted to arrive at the particular destination by a particular future time. The navigation information may include information related to walking, biking, driving, using public transportation (e.g., train, bus, etc.), etc. from the current location of computing device 10 to the destination at various times of day. Information retrieval module 62 may further send navigation information to prediction module 24 that includes information related to estimated durations of travel (e.g., travel times), distances, directions, and other information related to a person's travel using each of the different modes of transportation.

Prediction module 24 may obtain information from fitness module 26 related a fitness goals associated with the user of computing device 10 to determine a recommended mode of transportation, out of the available modes of transportation, which may aid the user in achieving a fitness goal. For example, prediction module 24 may receive one or more fitness goals from fitness module 26 along with one or more metrics (e.g., percent to completion, distance, duration of time, quantity of steps, etc.) that indicate previous progress made by the user towards achieving each fitness goal.

Prediction module 26 may utilize the navigation information related to the available modes of transportation, the fitness goals, and the metrics to provide a recommended mode of transportation. For example, prediction module 26 may assign a cost value to each of the available modes of transportation based on whether the respective mode will aid the user in achieving each goal and recommend the mode of transportation with the highest cost. Even though walking may be the slowest mode of transportation available to a user to travel to a particular destination, prediction module 24 may assign a high cost value to walking as a recommended mode of transportation since, prediction module 24 may determine that by walking, the user may perform a quantity of steps, walk for a duration of time, or walk for an amount of distance which may aid the user in achieving a walking-based fitness goal. Prediction module 24 may assign a low cost value to driving even though driving may be the fastest mode of transportation available to a user to travel to a particular destination since, prediction module 24 may determine that by driving, the user may not perform a quantity of steps or otherwise perform a physical activity or exercise that may help the user in achieving any of the fitness goals associated with the user.

In some examples, a fitness goal of a user may correspond to a minimum amount of physical activity or a maximum limit on physical activity. For example a fitness goal of a user who is rehabilitating from a heart attack may be a maximum heart rate, a fitness goal of a user who is rehabilitating from knee surgery may be a maximum amount of steps taken by the user each day, and prediction module 24 may assign a high cost value to driving and not to walking if driving is more likely to aid the user in achieving either of these fitness goals.

In some examples, to predict whether the user of computing device 10 would like fitness and navigation information, prediction module 24 may cause computing device 10 to output information, including location information, to information server system 60. Based on the outputted information, information server system 60 may send, to computing device 10, an indication of whether the user of computing device 10 would like fitness and navigation information. Prediction module 24 may determine whether the user of computing device 10 would like fitness and navigation information based on the indication received from information service system 60.

Computing device 10 receives the fitness and navigation information from information server system 60 and stores the fitness and navigation information. In some examples, computing device 10 may be configured to automatically output an indication of the fitness and navigation information (e.g., a notification indicating one or more available modes of transportation, a notification indicating at least a portion of one or more available modes of transportation, etc.). In other examples, computing device 10 may be configured to output at least an indication of the fitness and navigation information in response to detecting user input. For example, a user may perform a gesture, detected by UI device 12, which is indicative of requesting presentation of a predicted information graphical user interface (e.g., GUI 14). If a user of computing device 10 does not want to see the fitness and navigation information (e.g., because the user is not in need of the fitness and navigation information), the user may perform a gesture to dismiss the fitness and navigation information and computing device 10 will cease outputting the fitness and navigation information within GUI 14. In some examples, computing device 10 may be configured to change which computing device 10 determines that a user is likely in need of fitness and navigation information based on the user dismissing displayed fitness and navigation information. In this way, techniques of this disclosure may enable a computing device to automatically determine when a user is likely to want and/or need fitness and navigation information and automatically retrieve the fitness and navigation information without requiring the user to specifically search for the fitness and navigation information.

While the example shown in FIG. 1 illustrated prediction module 24 and fitness module 26 as being including within computing device 10, prediction module 24 and fitness module 26 may be included within information server system 60. In some examples the functionality provided by prediction module 24 and fitness module 26 may be wholly performed by computing device 10, wholly performed by information server system 60, or divided, in any manner, between computing device 10 and information server system 60.

As one example, computing device 10 may provide location information and information about a fitness goal of a user to information server system 60. Based on the location information and the fitness goal associated with the user, information server 60 may determine a recommended mode of transportation available to the user of computing device 10 to travel from the current location of computing device 10 to a particular destination such that the user is predicted to arrive at the particular destination by a particular future time, and also, is predicted to aid the user of computing device 10 in achieving the fitness goal. Responsive to sending the indication of the current location of computing device 10 and the fitness goal associated with the user of computing device 10, computing device 10 receive from information server system 60, an indication of the recommended mode of transportation. Computing device 10 may output the indication of the recommended mode of transportation for display (e.g., as user interface 14 including cards 16).

In some examples, computing device 10 may ascertain a fitness goal of a user of computing device 10 by receiving input from a user in response to a user interface presented at UID 12 to prompt the user about whether the user prefers various types of physical activities or exercises (e.g., walking, biking, etc.), whether the user prefers performing any of the various activities for some amount of time, whether the user prefers performing any of the various activities for some distance over a specified time period, etc. For example, a user could interact with the user interface of computing device 10 to input data at computing device 10 to establish a fitness goal corresponding to biking fifty miles per week or walking for twenty minutes per day.

In some examples, computing device 10 may determine that a user of computing device 10 is about to leave a location (e.g., as determined by device location module 22 which may determine a location history associated with the user, by movement of their phone based on radio (e.g., GPS, cellular, or wifi) signals, etc.). In some examples, responsive to determining that the user of computing device 10 is about to leave the location, computing device 10 may query a calendar associated with the user of computing device 10 to determine a time and location associated with the user's next appointment. Computing device 10 may determine whether the current time is past the appointment time (e.g., to determine whether the user is late to the appointment or not) and if the current time does exceed the appointment time (e.g., the user is late) computing device 10 may refrain from outputting a recommended mode of transportation for display at UID 12. If computing device 10 determines that the user is not late (e.g., the current time does not exceed the appointment time), computing device 10 may recommend one or more modes of transportation available to the user of computing device 10 to travel to the appointment location and to achieve his or her fitness goal.

In some examples, for each available travel mode, computing device 10 may determine an expected route between the current location of computing device 10 at which the user is about to leave and the location of the appointment (e.g., computing device 10 may query a map database to determine an estimated travel time, travel route, travel distance, etc.). Computing device 10 may compare the arrival time (e.g., current time+travel time) to the appointment start time to determine whether the user could utilize any of the available modes of transportation to travel to the appointment location. In some examples, if computing device 10 determines that the arrival time occurs after the appointment start time, computing device 10 may not output a recommended mode of transportation for display. In some examples, if the arrival time occurs prior to the appointment start time, computing device 10 may compare the travel time, travel distance, and historical travel time/distance associated with each mode of transportation to the fitness goal associated with the user for the specified time period to determine a recommended mode of transportation.

For example, if computing device 10 determines that a fitness goal associated with the user of computing device 10 actually corresponds to a fitness "cap" (e.g., a maximum amount of physical activity or exercise) for bicycling fifty miles per week, and the appointment is ten miles away, and further determines that the user has already bicycled forty-five miles in the past seven days, then computing device 10 may refrain from issuing a recommended mode of transportation of bicycling to prevent the user from exceeding the bicycle related fitness cap since bicycling to the appointment would put the user over the fitness cap. Conversely, if computing device 10 determines that bicycling to the appointment location would not cause the user to exceed the fitness cap, then computing device 10 may cause UID 12 to present an indication of the recommended mode of transportation (e.g., a user interface indicating that the user should bicycle to the appointment).

In some examples, computing device 10 may output an indication of a recommended mode of transportation via a notification, a text message, an audible alert, or other communication. In some examples, computing device 10 may output the indication of the recommended mode of transportation with additional information based on "hard time goals." For instance, based on a calendar of a user, or time goals provided by the user, computing device 10 may present one or more recommended modes of transportation along with additional information that indicates that the user can both achieve a fitness goal (or cap) and also accomplish the hard time goal (e.g., the additional information may include text that reads, "if leave now, you can walk to your meeting and arrive on time."

In other words, computing device 10 may "intelligently" provide one or more recommended modes of transportation to a user based on the fitness goals or caps associated with the user. For example, computing device 10 may refrain from recommending a one hundred fifty mile bicycle ride (even though the user has time available in his or her schedule) because the user has established a weekly fitness cap of one hundred miles of bicycling and the user has already bicycled fifty miles in the current week.

Figure 2:
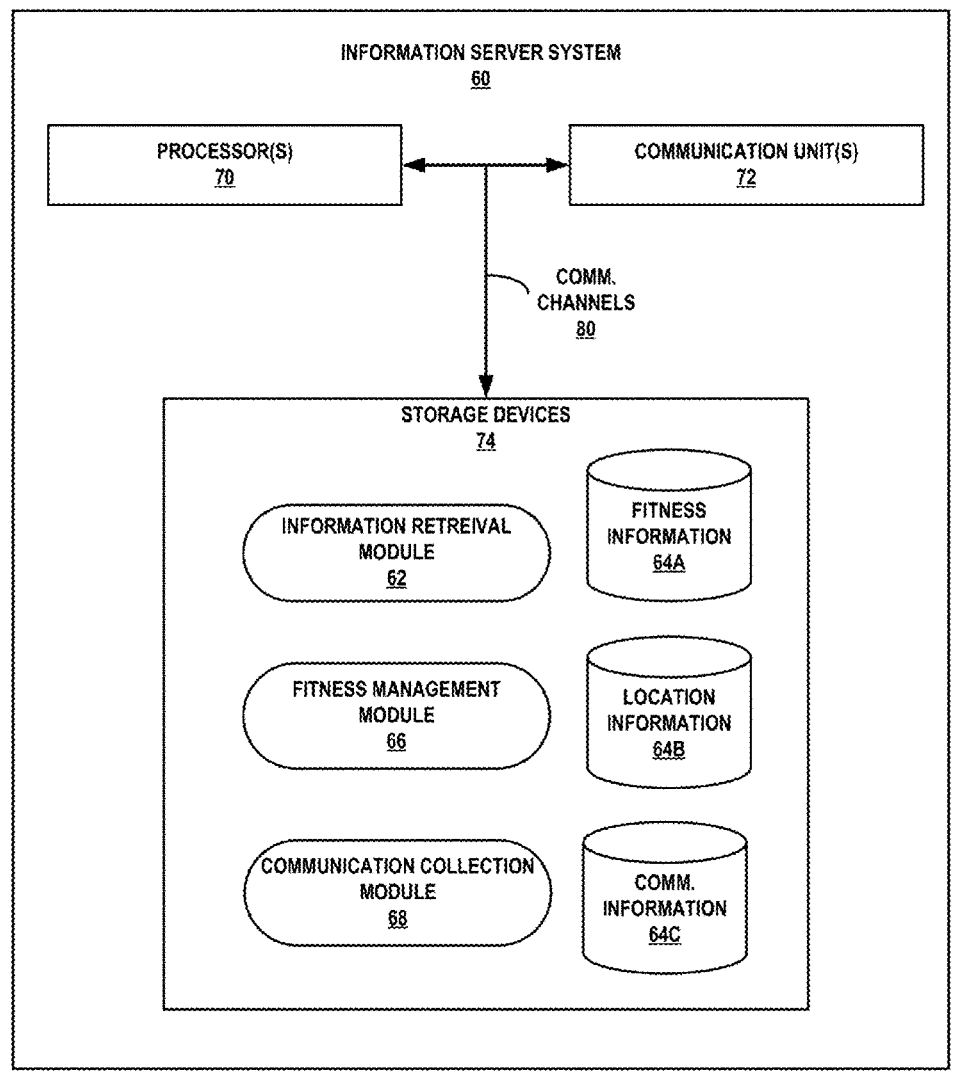
FIG. 2 is a block diagram illustrating an example computing system configured to determine a recommended mode of transportation based on a fitness goal, in accordance with one or more aspects of the present disclosure.

FIG. 2 is a block diagram illustrating an example computing system configured to determine a recommended mode of transportation based on a fitness goal, in accordance with one or more aspects of the present disclosure. Information server system 60 of FIG. 2 is described below within the context of FIG. 1. FIG. 2 illustrates only one particular example of information server system 60, and many other examples of information server system 60 may be used in other instances and may include a subset of the components included in example information server system 60 or may include additional components not shown in FIG. 2.

As shown in the example of FIG. 2, information server system 60 includes one or more processors 70, one or more communication units 72, and one or more storage devices 74. Storage devices 74 of information server system 60 also include information retrieval module 62, fitness management module 66, communication collection module 68, fitness information 64A, location information 64B, and communication information 64C. Communication channels 80 may interconnect each of the components 70, 72, and 74 for inter-component communications (physically, communicatively, and/or operatively). In some examples, communication channels 80 may include a system bus, a network connection, an inter-process communication data structure, or any other method for communicating data.

One or more communication units 72 of information server system 60 may communicate with external devices via one or more networks by transmitting and/or receiving network signals on the one or more networks. For example, information server system 60 may use communication unit 72 to transmit and/or receive radio signals on a radio network such as a cellular radio network. Examples of communication unit 72 include a network interface card (e.g. such as an Ethernet card), an optical transceiver, a radio frequency transceiver, a GPS receiver, or any other type of device that can send and/or receive information. Other examples of communication units 72 may include short wave radios, cellular data radios, wireless Ethernet network radios, as well as universal serial bus (USB) controllers.

One or more storage devices 74 within information server system 60 may store information for processing during operation of information server system 60 (e.g., information server system 60 may store data accessed by modules 62, 66, and 68 during execution at information server system 60). In some examples, storage devices 74 are a temporary memory, meaning that a primary purpose of storage devices 74 is not long-term storage. Storage devices 74 on information server system 60 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 74, in some examples, also include one or more computer-readable storage media. Storage devices 74 may be configured to store larger amounts of information than volatile memory. Storage devices 74 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 74 may store program instructions and/or data associated modules 62, 66, and 68.

One or more processors 70 may implement functionality and/or execute instructions within information server system 60. For example, processors 70 on information server system 60 may receive and execute instructions stored by storage devices 74 that execute the functionality of modules 62, 66, and 68. These instructions executed by processors 70 may cause information server system 60 to store information, within storage devices 74 during program execution. Processors 70 may execute instructions of modules 62, 66, and 68 to provide fitness and navigation information to one or more computing devices (e.g., computing device 10 of FIG. 1). That is, modules 62, 66, and 68 may be operable by processors 70 to perform various actions or functions of information server system 60.

Information server system 60 may provide access to the data stored at data stores 64A, 64B, and 64C as a cloud based data access service to devices connected to network 30 (shown in FIG. 1), such as computing device 10. For example, modules 62, 66, and 68 may receive a request over network 30 from computing device 10 for information stored at data stores 64A, 64B, and 64C and modules 62, 66, and/or 68 may provide a portion of the stored information via communication units 72 in response to the request.

In some examples, communication collection module 68 may collect (i.e., receive) communication information associated with various users of computing devices (e.g., computing device 10 of FIG. 1) including any combination of calendar information, message information (e-mail, text-based message, voice messages), social media network information (e.g., profile information, friends lists, messages, etc.) and other types of communication information from a number of different computing devices over a period of time, but only if information server system 60 receives explicit permission from the various users of the computing devices to receive and analyze the information. Throughout this disclosure, the term "communication information" is used to refer to any information being communicated by a user of a computing device and another person or machine (e.g., e-mail, SMS messages, voice-based messages or conversations, video-based messages or conversations, text-based messages or conversations, social media networking posts, social media interactions, social media status updates, other social media interactions, friends lists, calendars, instant chat communications, electronic purchases, ratings, Internet browsing and/or search history, etc.).

For example, in situations discussed herein in which information server system 60 may collect or may make use of personal information about any user (e.g., communication information), the user may be provided with an opportunity to control whether programs or features of the computing system can collect user information (e.g., a user's current location, a user's e-mail, etc.), or to control whether and/or how to the computing device may receive content that may be relevant to the user. In addition, certain data may be treated in one or more ways before it is stored or used by the computing device, so that personally identifiable information is removed. For example, a user's calendar information, preferences, geographic locations, etc., may be generalized so that an exact user's calendar, preference, and geographic location cannot be determined. Thus, the user may have control over how information is collected about the user and used by information server system 60.

Communication collection module 68 may store portions of communication information as data in communication information data store 64C. Communication collection module 68 may organize the communication information according to date, time, location, and/or topic of interest. Information retrieval modules 62 and/or fitness management module 66 may perform a date, time, location, and/or topic of interest query against the data in communication information data store 64C to retrieve a portion of the communication information.

For example, communication collection module 68 may generate an interest graph using the communication information and store the interest graph at data store 64C. Fitness management module 66 and information retrieval module 62 may access the interest graph at data store 64C by performing queries on the data at data store 64C or in response to queries sent through communication collection module 68. The interest graph may include one or more nodal topics of interest with links of the interest graph connecting related topics of interest. Each topic of interest may include a corresponding value that indicates a degree or level of interest. For example, communication collection module 68 may identify one or more keywords associated with bicycle riding within the text of an e-mail message that a user receives after purchasing a new bicycle on the Internet and insert bicycle riding as one of the nodes in the interest graph. Overtime, as communication collection module 68 receives additional communications related to bicycles, bicycle riding, etc. communication collection module 68 may increase a level of interest associated with the topic of bicycle riding to indicate that the user may be highly interested in bicycles. Communication collection module 68 may link the bicycle riding topic of interest to various other related topics of interest that communication collection module 68 adds to the interest graph (e.g., different physical activities, exercises, modes of transportation, etc.). Responsive to a query within data store 64C for one or more physical activities, exercises, or modes of transportation which are of interest to the user, information retrieval module 62 and fitness management module 66 may obtain an indication that bicycle riding is a physical activities, exercise, or modes of transportation which is of interest to the user. In addition to, or as an alternative to generating an interest graph, communication module 28 may organize the data at data store 64C (e.g., in the form of a database) to include portions of information related to one or more physical activities, exercises, and transportation modes which are of interest to a user.

Communication collection module 28 may determine one or more future times, dates, and locations based on communications that may be of interest to the user and store the information at data stores 64C. For example, communication collection module 68 may obtain a calendar associated with the user of computing device 10 and determine that the user has a meeting scheduled for a future time, at a future destination. Communication collection module 68 may store the future time and future destination as communication information at data store 64C. Information retrieval module 62 and fitness management module 66 may obtain information about the future time and future destination in response to a query at data store 64C for information related to a current time and current location when the current location of computing device 10 and/or the current time is within a threshold time and distance of the future time and future destination. In any event, information retrieval modules 62 and fitness management module 66 may perform a date, time, location, and/or topic of interest query against the data in communication information data store 64C to retrieve a portion of the communication information to provide a recommended mode of transportation available to the user of computing device 10 to travel from a current location to a destination by a future time.

Fitness management module 66 may provide similar functionality as fitness module 26, prediction module 24, and/or device location module 22 of computing device 10, shown in FIG. 1. That is, fitness management module 66 may automatically output fitness and navigation information for transmission to computing device 10 without user intervention. For example, by performing a query against the communication (e.g., calendar) information stored at data store 64C, fitness management module 66 may obtain information about a future destination at which a user of computing device 10 is schedule to arrive at by a future time. Fitness management module 66 may cause information retrieval module 62 to perform a query against the information stored at data store 64B to obtain the current location of computing device 10 and one or more modes of transportation available to the user of computing device 10 to travel from the current location of computing device 10 to the future destination such that the user arrives or is predicted to arrive at the future destination by a future time. Fitness management module 66 may determine a recommended mode of transportation from the one or more available modes of transportation which is predicted to aid the user in achieving the fitness goal associated with the user of computing device 10 stored at fitness information 64A. Fitness management module 66 may cause communication units 72 to output an indication of the recommended mode of transportation for transmission to computing device 10.

In some examples, fitness management module 66 may obtain information related to an expected travel route associated with each of the modes of transportation available to the user of computing device 10 to travel between the current location of computing device 10 and the destination and determine an estimated amount of energy expended by the user of computing device 10 after traveling along the expected travel route associated with each of the modes of transportation. Said differently, fitness management module 66 may determine a predicted amount of energy associated with each of the modes of transportation. The predicted amount of energy associated with each of the modes of transportation my correspond to an amount of energy predicted to be expended by the user of computing device 10 while using each of the modes of transportation to travel from the current location of computing device 10 to the destination, and may determine, based at least in part on the predicted amount of energy associated with each of the modes of transportation, the recommended mode of transportation.

For example, responsive to querying information retrieval module 62 for one or more available modes of transportation between the current location of computing device 10 and the destination, fitness management module 66 may obtain, from information retrieval module 62, a travel route associated with each of the modes of transportation and additional information about the travel route (e.g., distance, travel time, terrain, elevation, etc.). Fitness management module 66 may correlate the travel route of each of the available modes of transportation with the fitness information associated with the user of computing device 10 stored at fitness information 64A to determine an estimated or predicted amount of energy expended by the user of computing device 10 when traveling along each of the different travel routes using the corresponding mode of transportation. For example, fitness management module 66 may determine a quantity of calories, kilocalories, joules, etc. that the user of computing device 10 is predicted to burn while traveling along a travel route to a destination using the different available modes of transportation.

Based at least in part on the estimated or predicted amount of energy associated with each of the modes of transportation, fitness management module 66 may determine the recommended mode of transportation. For example, fitness management module 66 may recommend the mode of transportation that fitness management module 66 predicts will require the most amount of energy. In other words, when a fitness goal associated with the user is to burn energy, the estimated amount of energy associated with the recommended mode of transportation determined by fitness management module 66 may exceed the estimated amount of energy associated with each of the other available modes of transportation. In some examples, fitness management module 66 may recommend the mode of transportation that fitness management module 66 predicts will require the least amount of energy. In other words, when a fitness goal associated with the user is to perform less activity or not expend energy, the estimated amount of energy associated with the recommended mode of transportation may be less than the estimated amount of energy associated with each of the other modes of transportation.

In some examples, fitness management module 66 may obtain weather or traffic information associated with an expected travel route and may determine the recommended mode of transportation based at least in part on the weather or traffic information. For example, the fitness information stored at data store 64A may include a preference associated with the user of computing device 10 for performing a physical activity or exercise (e.g., bicycling, running, jogging, etc.) when the weather or traffic information satisfies a particular weather or traffic threshold (e.g., a temperature range, a wind speed, an amount of precipitation per unit of time, a particular amount of traffic per unit of time, a particular amount of vehicles per unit of time, etc.).

Responsive to querying information retrieval module 62 for one or more available modes of transportation between the current location of computing device 10 and the destination, fitness management module 66 may obtain, from information retrieval module 62, a travel route associated with each of the modes of transportation and additional weather or traffic information about the travel route (e.g., a temperature, a wind speed, an amount of precipitation per unit of time, a particular amount of traffic per unit of time, a particular amount of vehicles per unit of time, etc., etc.). The weather or traffic information may include information about current weather or traffic and future weather or traffic along the expected travel route associated with each of the available modes of transportation. Fitness management module 66 may compare the weather or traffic information for each expected travel route to the weather or traffic thresholds stored at data store 64C to determine a recommended mode of transportation. In other words, fitness management module 66 may determine that the each of the one or more available modes of transportation which include weather or traffic information that satisfies the weather or traffic thresholds corresponds to a recommended mode of transportation.

For example, fitness management module 66 may determine that the weather information along the expected bicycle travel route obtained from information retrieval module 62 does not satisfy (e.g., exceeds) a weather threshold for riding a bicycle (e.g., one inch of rainfall per twelve hours). Fitness management module 66 may determine that the recommended mode of transportation is not riding a bicycle, but rather the recommended mode of transportation is walking, jogging, or riding a bus.

In some examples, fitness management module 66 may obtain an indication of a change in weather or traffic along an expected travel route associated with the recommended mode of transportation between the current location of the computing device and the destination, and responsive to the change in the weather or traffic, fitness management module 66 may cause communication units 72 to output for transmission to computing device 10, an indication of a second recommended mode of transportation that is different from a first (e.g., previous) recommended mode of transportation. For example, after recommending that the user take a bus to a destination because of wet weather in the forecast, fitness management module 66 may obtain updated weather or traffic information from information retrieval module 62 along the expected travel route associated with bicycle riding, and based on the updated weather or traffic information, fitness management module 66 may determine that rain is no longer expected to fall along the expected bicycle travel route and may determine that the recommended mode of transportation is riding a bicycle.

In some examples, fitness management module 66 may determine a preferred mode of transportation associated with the user and may determine a recommended mode of transportation of a user of computing device 10 based at least in part on the preferred mode of transportation associated with the user. For example, fitness management module 66 may cause information retrieval module 62 to perform a query for each available mode of transportation within the data stored at communication information data store 64C to determine whether any previously received communications associated with the user indicate a preference for at least one of the available modes of travel. Fitness management module 66 may determine that the user has a preference for each available mode of transportation that information retrieval module 62 identifies within communication information data store 64C and may cause communication units 72 to output an indication of the one or more preferred modes of transportation as an indication of one or more recommended mode of transportation to computing device 10.

In some examples, fitness management module 66 may determine a frequency of use associated with different modes of transportation and store the frequency of use as fitness information at data store 64A. Fitness management module 66 may determine the preferred and therefore recommended mode of transportation as an available mode of transportation that corresponds to one of the modes of transportation with a highest frequency of use. For example, fitness management module 66 may obtain information from fitness information data store 64A about various types of physical activities or exercises associated with the user of computing device 10. The information may indicate of an amount of time or distance that the user has spent or plans on spending performing each of the various types of physical activities or exercises over a time duration. Fitness management module 66 may determine that the various types of physical activities which the user performs most often or plans on performing more frequently are the preferred modes of transportation. Fitness management module 66 may determine the recommended mode of transportation as being one of the available modes of transportation that corresponds to one of the most frequently used modes of transportation.

Figure 3:
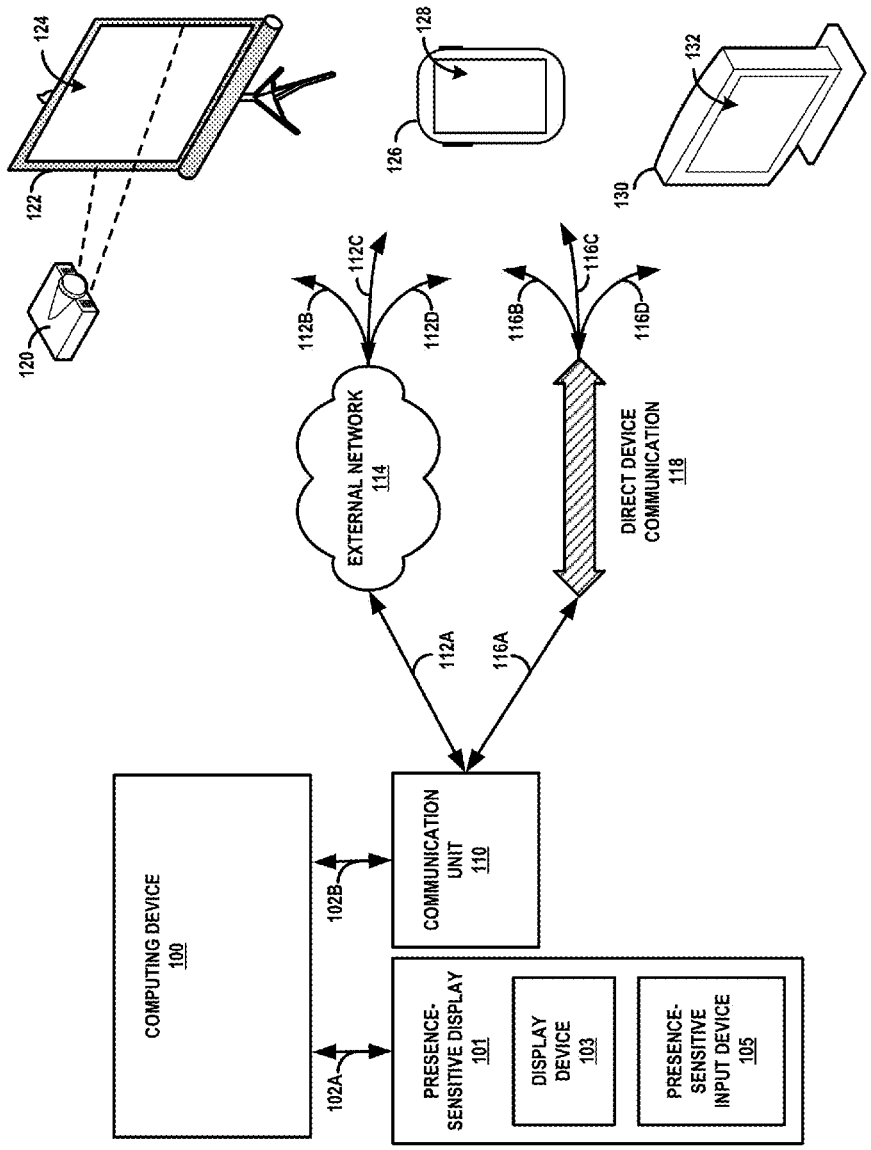
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, mobile device 126, and visual display device 130. Although shown for purposes of example in FIG. 1 as a stand-alone computing device 10, a computing device such as computing devices 10, 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processors 70 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 10 in FIG. 1, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, heads up display (HUD) and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, computerized watches, computerized eyeglasses, etc. Examples of visual display device 130 may include other semi-stationary devices such as televisions, computer monitors, automobile displays, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of UID 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Responsive to sending an indication of a current location of computing device 100 and a fitness goal of a user of computing device 100 to a computing system (e.g., information server 60 of FIGS. 1 and 2), computing device 100 may receive, from the computing system, an indication of a recommended mode of transportation. The recommended mode of transportation may be a particular mode of transportation available to the user of computing device 100 to travel from the current location of computing device 100 to a particular destination such that the user is predicted to arrive at the particular destination by a particular future time and is predicted to aid the user of computing device 100 in achieving the fitness goal. Computing device 100 may output, for display, an indication of the recommended mode of transportation to visual display device 130. Computing device 100 may output, for display, an indication of the recommended mode of transportation via direct device communication 118 or external network 114 to display device 130. In some examples, display device 130 outputs the indication for display to a user. The user may, in turn, select or dismiss some or all of the displayed indication of the recommended mode of transportation. Computing device 100 and display device 130 may be configured such that selection of a particular element of the displayed indication of the recommended mode of transportation (e.g., a displayed telephone number), may cause computing device 100 to obtain navigation information (e.g., directions, schedules, times, distances, etc.) associated with the recommended mode of transportation.

Figure 4:
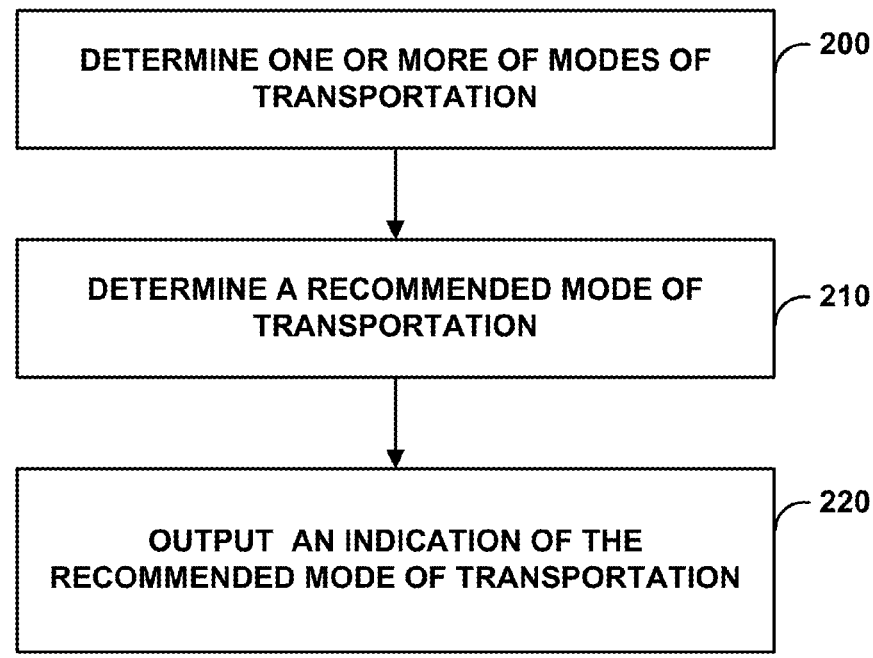
FIG. 4 is a flowchart illustrating example operations of an example computing system configured to determine a recommended mode of transportation based on a fitness goal, in accordance with one or more aspects of the present disclosure.

FIG. 4 is a flowchart illustrating example operations of an example computing system configured to determine a recommended mode of transportation based on a fitness goal, in accordance with one or more aspects of the present disclosure. The process of FIG. 4 may be performed by one or more processors of a computing system, such as computing system 1 of FIG. 1 including information server system 60 and computing device 10. For purposes of illustration, FIG. 4 is described below within the context of information server system of FIG. 2.

Information server system 60 may determine one or more moved of transportation (200). For example, fitness management module 66 may query information retrieval module 62 for one or more modes of transportation available to a user of a computing device (e.g., computing device 10) to travel from a current location of computing device 10 to a particular destination such that the user is predicted to arrive at the particular destination by a particular future time. Responsive to the query, fitness management module 66 may obtain information about the available modes of transportation from information retrieval module 62 along with additional information for each mode, such as, expected travel routes, estimated times, estimated distances, elevations, weather or traffic information along an expected travel route, etc.

Information server system 60 may determine a recommended mode of transportation (210). For instance, based at least in part on a fitness goal associated with the user of computing device 10, fitness management module 66 may determine a recommended mode of transportation from the one or more modes of transportation that fitness management module 66 predicts may aid the user in achieving the fitness goal. Fitness management module 66 may analyze the available modes of transportation obtained from information retrieval module 62 to determine a predicted amount of energy associated with each of the available modes of transportation that the user of computing device 10 is predicted to be expended by the user of the computing device while using each of the modes of transportation to travel from the current location of the computing device to the destination (e.g., along the expected travel route). Fitness management module 66 may select one of the available modes, based on the energy predictions, as a recommended mode of transportation. For instance, fitness management module 66 may determine that the mode of transportation that fitness management module 66 predicts will cause the user to expend the most amount of energy, yet still allow the user to arrive at the destination on time, is the recommended mode of transportation to help the user in achieving the fitness goal.

Information server system 60 may output an indication of the recommended mode of transportation (220). For example, that fitness management module 66 may cause communication units 72 to output, for transmission to computing device 10, a list of recommended modes of transportation in ranked order, with the recommended mode of transportation being ranked the highest or likely to be the most useful to the user to assist the user in achieving his or her fitness goal.

Figure 5:
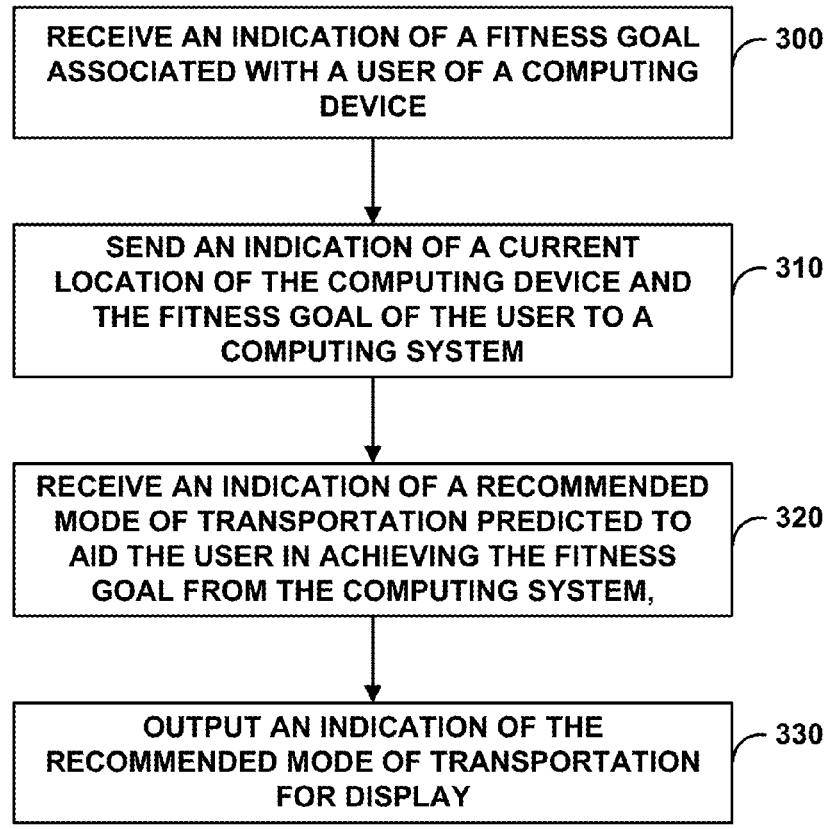
FIG. 5 is a flowchart illustrating example operations of an example computing device configured to determine a recommended mode of transportation based on a fitness goal, in accordance with one or more aspects of the present disclosure.

FIG. 5 is a flowchart illustrating example operations of an example computing device configured to determine a recommended mode of transportation based on a fitness goal, in accordance with one or more aspects of the present disclosure. The process of FIG. 5 may be performed by one or more processors of a computing device, such as computing device 10 and computing device 100 illustrated in FIG. 1 and FIG. 3. For purposes of illustration, FIG. 5 is described below within the context of computing device 10 and computing system 1 of FIG. 1.

Computing device 10 may receive an indication of a fitness goal associated with the user of computing device 10 (300). For instance, fitness module 26 may receive an indication of a user input at UID 12 as a user interacts with user interface 14 to input one or more fitness goals associated with the user, select one or more metrics that the user wants computing device 10 to track, etc.

Computing device 10 may send an indication of a current location of the computing device and the fitness goal associated with the user to a computing system (310). For example, device location module 22 may determine an approximate location of computing device 10 and transmit an indication over network 30 of the approximate current location to information server system 60. In addition, fitness module 26 may transmit the fitness information over network 30, including the fitness goal associated with the user, to information server system 60 which may store the fitness information at data store 64A.

Computing device 10 may receive an indication of a recommended mode of transportation predicted to aid the user in achieving the fitness goal from the computing system (320). For example, prior to a start time of an appointment on a calendar or schedule associated with the user, computing device 10 may receive an indication of one or more recommended modes of transportation available to the user of computing device 10 to travel from the current location of computing device 10 to the location of the appointment to arrive at the location of the appointment on-time and prior to the start time.

The indication of the recommended modes of transportation may further be based on a prediction that each of the one or more recommended modes of transportation may aid the user in achieving the fitness goal. For example, one hour prior to the start of a meeting, computing device 10 may receive information from information server system 60 that indicates that the user of computing device 10 could walk to the meeting in fifty minutes from the current location of computing device 10 to achieve a daily walking goal. The information may further indicate that the user of computing device 10 could bike to the meeting in twenty five minutes in current traffic to burn more energy and work towards achieving an energy level goal. The information may further indicate that the user of computing device 10 could take a bus to the meeting in fifteen minutes given the current bus schedule and traffic conditions to maintain or achieve a fitness goal related to keeping a low heart rate. The information may further indicate that the user of computing device 10 could drive to the meeting in twenty minutes in current heavy traffic and the information may include a warning that indicates that driving could increase the heart rate associated with the user and not help in achieving the low heart rate goal.

Computing device 10 may output an indication of the recommended mode of transportation for display (330). For example, computing device 10 may compile the information received from information server system 60 into a graphical user interface (e.g., user interface 14 including cards 16) and cause UID 12 to present the fitness and navigation information about the one or more recommended modes of transportation at a screen.

In some examples, computing device 10 may receive an indication of one or more preferred modes of transportation associated with the user of computing device 10, and send, to information server system 60, an indication of the one or more preferred modes of transportation associated with the user of computing device 10. The recommended mode of transportation received from information server system 60 may be one of the one or more preferred modes of transportation.

For example, fitness module 26 of computing device 10 may receive input from various sensors of computing device 10 that indicate various types of physical activities that the user of computing device 10 performs (e.g., accelerometer or location information that indicates whether the user is standing, walking, bicycling, driving, etc. from one location to another). Fitness management module 66 of information server system 60 may receive fitness information associated with each of the types of physical activities that the user performs from fitness module 26. Fitness management module 66 may determine a frequency of use for each type of physical activity and based on the frequency of use, determine a preferred type of physical activity, and/or a preferred mode of transportation associated with the user.

In some examples, the recommended mode of transportation received from information server system 60 may be a first recommended mode of transportation, and computing device 10 may receive, from information server system 60, an indication of a second recommended mode of transportation. The second recommended mode of transportation may be different from the first recommended mode of transportation and may further be received in response to a change in at least one of weather information or traffic information detected by information server system 60. For example, computing device 10 may receive an updated indication of a recommended mode of transportation if information server system 60 detects a change in weather or traffic conditions along the expected travel route associated with the user that causes either the recommended mode of transportation to not be one of the available modes that a user may use to arrive at the destination by the future time, or to not be one of the preferred modes given the current weather or traffic conditions to assist the user in achieving his or her fitness goal.

Information server system 60 and/or computing device 10 may analyze information (e.g., communications, locations, speeds, etc.) associated with information server system 60 and/or computing device 10 only if information server system 60 and/or computing device 10 receive permission from the user to analyze the information. For example, in situations described herein in which information server system 60 and/or computing device 10 may collect or may make use of information associated with the user and information server system 60 and/or computing device 10, the user may be provided with an opportunity to control whether programs or features information server system 60 and/or computing device 10 can collect and make use of user information (e.g., information about a user's e-mail, a user's social network, social actions or activities, profession, a user's preferences, or a user's past and current location), or to control whether and/or how information server system 60 and/or computing device 10 may receive content that may be relevant to the user. In addition, certain data may be treated in one or more ways before it is stored or used by information server system 60 and/or computing device 10, so that personally identifiable information is removed. Thus, the user may have control over how information is collected about the user and used by information server system 60 and/or computing device 10.

Clause 1. A method, comprising: determining, by a computing system, one or more of modes of transportation available to a user of a computing device to travel from a current location of the computing device to a particular destination such that the user is predicted to arrive at the particular destination by a particular future time; determining, by the computing system and based at least in part on a fitness goal associated with the user of the computing device, a recommended mode of transportation from the one or more modes of transportation, the recommended mode of transportation being a particular mode of transportation predicted to aid the user in achieving the fitness goal; and outputting, by the computing system, for transmission to the computing device, an indication of the recommended mode of transportation.

Clause 2. The method of clause 1, further comprising: determining, by the computing system, a predicted amount of energy associated with each of the modes of transportation, wherein the predicted amount of energy associated with each of the modes of transportation is an amount of energy predicted to be expended by the user of the computing device while using each of the modes of transportation to travel from the current location of the computing device to the destination; and determining, by the computing system, based at least in part on the predicted amount of energy associated with each of the modes of transportation, the recommended mode of transportation.

Clause 3. The method of clause 2, wherein the predicted amount of energy associated with the recommended mode of transportation exceeds the predicted amount of energy associated with each of the other modes of transportation.

Clause 4. The method of clause 2, wherein the predicted amount of energy associated with the recommended mode of transportation is less than the predicted amount of energy associated with each of the other modes of transportation.

Clause 5. The method of any of clauses 1-4, wherein determining the recommended mode of transportation further comprises: determining, by the computing system, an expected travel route associated with the recommended mode of transportation between the current location of the computing device and the destination; and obtaining, by the computing system, weather or traffic information associated with the expected travel route, wherein the recommended mode of transportation is determined based at least in part on the weather or traffic information.

Clause 6. The method of clause 5, wherein the weather or traffic information comprises information about current weather or traffic and future weather or traffic along the expected travel route associated with the recommended mode of transportation.

Clause 7. The method of any of clauses 1-6, wherein the recommended mode of transportation is a first mode of transportation, the method further comprising: obtaining, by the computing system, an indication of a change in weather or traffic along an expected travel route associated with the recommended mode of transportation between the current location of the computing device and the destination; and responsive to the change in the weather or traffic, outputting, by the computing system, for transmission to the computing device, an indication of a second recommended mode of transportation, the second recommended mode of transportation being different from the first recommended mode of transportation.

Clause 8. The method of any of clauses 1-7, wherein determining the recommended mode of transportation further comprises determining, by the computing system, a preferred mode of transportation associated with the user, wherein the recommended mode of transportation is determined based at least in part on the preferred mode of transportation associated with the user.

Clause 9. The method of clause 8, wherein determining the preferred mode of transportation associated with the user further comprises obtaining, by the computing system, communication information associated with the user of the computing device, wherein the preferred mode of transportation is determined based at least in part on a portion of the communication information associated with the user.

Clause 10. The method of any of clauses 8-9, wherein determining the preferred mode of transportation associated with the user further comprises: determining, by the computing system, a frequency of use associated the user of the computing device for each of the modes of transportation; and determining, by the computing system, based on the frequency of use associated for each of the modes of transportation, the preferred mode of transportation, wherein the preferred mode of transportation corresponds to one of the modes of transportation with a highest frequency of use.

Clause 11. The method of any of clauses 1-10, further comprising: obtaining, by the computing system, information about a type of physical activity associated with the user of the computing device, wherein the recommended mode of transportation is determined based at least in part on the information about the type of physical activity associated with the user of the computing device.

Clause 12. A computing system comprising: at least one processor; and at least one module operable by the at least one processor to: determine one or more of modes of transportation available to a user of a computing device to travel from a current location of the computing device to a particular destination such that the user is predicted to arrive at the particular destination by a particular future time; determine, based at least in part on a fitness goal associated with the user of the computing device, a recommended mode of transportation from the one or more modes of transportation, the recommended mode of transportation being a particular mode of transportation predicted to aid the user in achieving the fitness goal; and output, for transmission to the computing device, an indication of the recommended mode of transportation.

Clause 13. The computing system of clause 12, wherein the at least one module is further operable by the at least one processor to: determine a predicted amount of energy associated with each of the modes of transportation, wherein the predicted amount of energy associated with each of the modes of transportation is an amount of energy predicted to be expended by the user of the computing device while using each of the modes of transportation to travel from the current location of the computing device to the destination; and determine, based at least in part on the predicted amount of energy associated with each of the modes of transportation, the recommended mode of transportation.

Clause 14. The computing system of any of clauses 12-13, wherein the at least one module is further operable by the at least one processor to: determine an expected travel route associated with the recommended mode of transportation between the current location of the computing device and the destination; and obtain weather information along the expected travel route associated with the recommended mode of transportation, wherein the recommended mode of transportation is determined based at least in part on the weather information.

Clause 15. The computing system of any of clauses 12-14, wherein the at least one module is further operable by the at least one processor to determine a preferred mode of transportation associated with the user and determine the recommended mode of transportation based at least in part on the preferred mode of transportation associated with the user.

Clause 16. The computing system of clause 15, wherein the at least one module is further operable by the at least one processor to obtain communication information associated with the user of the computing device and determine the preferred mode of transportation based at least in part on a portion of the communication information associated with the user.

Clause 17. The computing system of any of clauses 12-16, wherein the at least one module is further operable by the at least one processor to: obtain an indication of a change in weather or traffic along an expected travel route associated with the recommended mode of transportation between the current location of the computing device and the destination; and responsive to the change in the weather or traffic, output for transmission to the computing device, an indication of a second recommended mode of transportation, the second recommended mode of transportation being different from the first recommended mode of transportation.

Clause 18. The computing system of claim 12 comprising means for performing any of the method of any of clauses 1-11.

Clause 19. A computer-readable storage medium encoded with instructions for causing one or more programmable processors to perform the method recited by any of clauses 1-11.

Clause 20. A method comprising: receiving, by a computing device, an indication of a fitness goal of a user of the computing device; sending, by the computing device, to a computing system, an indication of a current location of the computing device and the fitness goal associated with the user of the computing device; receiving, by the computing device, from the computing system, an indication of a recommended mode of transportation, the recommended mode of transportation being a particular mode of transportation available to the user of the computing device to travel from the current location of the computing device to a particular destination such that the user is predicted to arrive at the particular destination by a particular future time, wherein the recommended mode of transportation is predicted to aid the user of the computing device in achieving the fitness goal; outputting, by the computing device and for display, an indication of the recommended mode of transportation.

Clause 21. The method of clause 20, the method further comprising: receiving, by the computing device, an indication of one or more preferred modes of transportation associated with the user of the computing device; and sending, by the computing device, to the computing system, an indication of the one or more preferred modes of transportation associated with the user of the computing device, wherein the recommended mode of transportation received from the computing system is one of the one or more preferred modes of transportation.

Clause 22. The method of any of clauses 20-21, wherein the recommended mode of transportation is a first recommended mode of transportation, the method further comprising: receiving, by the computing device, from the computing system, an indication of a second recommended mode of transportation, the second recommended mode of transportation being different from the first recommended mode of transportation, wherein the second recommended mode of transportation is received in response to a change in at least one of weather information or traffic information detected by the computing system.

Clause 23. A computing device comprising at least one module and at least one processor, the at least one module being operable by the at least one processor to receive, an indication of a fitness goal of a user of the computing device; send, to a computing system, an indication of a current location of the computing device and the fitness goal associated with the user of the computing device; receive, from the computing system, an indication of a recommended mode of transportation, the recommended mode of transportation being a particular mode of transportation available to the user of the computing device to travel from the current location of the computing device to a particular destination such that the user is predicted to arrive at the particular destination by a particular future time, wherein the recommended mode of transportation is predicted to aid the user of the computing device in achieving the fitness goal; outputting, by the computing device and for display, an indication of the recommended mode of transportation.

Clause 24. The computing device of clause 23 comprising means for performing any of the method of any of clauses 20-22.

Clause 25. A computer-readable storage medium encoded with instructions for causing one or more programmable processors to perform the method recited by any of clauses 20-22.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:
1. A method comprising:
receive, by the computing system, an indication of movement associated with a computing device;
responsive to determining, based on the movement, when a user of the computing device performs physical activity, determining, by the computing system, a fitness goal associated with the user of the computing device;
determining, by the computing system, two or more modes of transportation available to the user of the computing device to travel along an expected travel route from a location of the computing device to a particular destination;
determining, by the computing system, based at least in part on the fitness goal associated with the user of the computing device, a first recommended mode of transportation from the two or more modes of transportation available to the user, wherein use of the first recom- mended mode of transportation is predicted to aid the user in achieving the fitness goal;

outputting, by the computing system, for transmission to the computing device, an indication of the first recommended mode of transportation; and responsive to a change in weather along the expected travel route, outputting, by the computing system, for transmission to the computing device, an indication of a second recommended mode of transportation from the two or more modes of transportation available to the user, the second recommended mode of transportation being different from the first recommended mode of transportation, wherein use of the second recommended mode of transportation is predicted to aid the user in achieving the fitness goal.

2. The method of claim 1, wherein the indication of the second mode of transportation is further output in response to determining that the weather along the expected travel route satisfies a weather threshold that is indicative of a preferred weather condition that the user prefers while using the second mode of transportation.

3. The method of claim 1, further comprising:
determining, by the computing system, respective amounts of energy predicted to be expended by the user of the computing device while using each of the two or more modes of transportation available to the user to travel from the location of the computing device to the particular destination, wherein the first recommended mode of transportation is further determined based at least in part on the respective amount of energy associated with each of the two or more modes of transportation.

4. The method of claim 3, wherein the first recommended mode of transportation is further determined in response to determining that the respective amount of energy associated with the first recommended mode of transportation exceeds the respective amount of energy associated with the second recommended mode of transportation.

5. The method of claim 3, wherein the first recommended mode of transportation is further determined in response to determining that the respective amount of energy associated with the first recommended mode of transportation is less than the respective amount of energy associated with the second recommended mode of transportation.

6. The method of claim 1, wherein determining the first recommended mode of transportation further comprises:
obtaining, by the computing system, weather or traffic information associated with the expected travel route, wherein the first recommended mode of transportation is determined based at least in part on a weather forecast or a traffic condition associated with the weather or traffic information.

7. The method of claim 1, further comprising:
obtaining, by the computing system, an indication of a change in traffic along the expected travel route, wherein the indication of the second recommended mode of transportation is further output in response to the change in the traffic.

8. The method of claim 1, further comprising:
determining, by the computing system, a respective frequency of use associated the user of the computing device for each of the two or more modes of transportation available to the user; and
determining, by the computing system, based on the respective frequency of use associated for each of the two or more modes of transportation available to the user and from among the two or more available modes of transportation, the first and second recommended modes of transportation, wherein the first and second recommended modes of transportation are the two modes of transportation available to the user from the two or more modes of transportation available to the user with highest respective frequencies of use.

9. The method of claim 1, further comprising:
determining, based on communication information associated with the user of the computing device, data indicative of at least one mode of transportation from the two or more modes of transportation available to the user, wherein the communication information comprises at least one of calendar information, e-mail message information, text-based message information, voicemail message information, or social media network information, wherein the first recommended mode of transportation is further determined based at least in part on the data indicative of the at least one mode of transportation from the two or more modes of transportation available to the user.

10. The method of claim 1, further comprising:
determining, by the computing system, based on the communication information associated with the user of the computing device, data indicative of fitness goals or nutritional diets, wherein the fitness goal associated with the user of the computing device is further determined based on the data indicative of the fitness goals or nutritional diets.

11. A computing system comprising:
at least one processor; and
at least one module operable by the at least one processor to:
determine two or more modes of transportation available to a user of a computing device to travel from a location of the computing device to a particular destination to arrive at the destination by a future time;
determine, based at least in part on a fitness goal associated with the user of the computing device, a first respective cost value associated with each of the two or more modes of transportation indicative whether the respective mode will aid the user in achieving each goal;
determine, based on the first respective cost value of a first recommended mode of transportation from the two or more modes of transportation available to the user, that the first recommended mode of transportation is predicted to aid the user in achieving the fitness goal;
output, for display by the computing device, an indication of the first recommended mode of transportation;
responsive to a change in weather along an expected travel route associated with the first recommended mode of transportation between the location of the computing device and the particular destination, determine, based at least in part on the fitness goal associated with the user of the computing device, a second respective cost value associated with each of the two or more modes of transportation based on whether the respective mode will aid the user in achieving each goal;
determine, based on the second respective cost value of a second recommended mode of transportation from the two or more modes of transportation available to the user, that the second recommended mode of transportation is predicted to aid the user in achieving the fitness goal, the second recommended mode of transportation being different from the first recommended mode of transportation; and output, for display by the computing device, an indication of the second recommended mode of transportation.

12. The computing system of claim 11, wherein the at least one module is further operable by the at least one processor to the indication of the second mode of transportation in response to determining that the weather along the expected travel route satisfies a weather threshold that is indicative of a preferred weather condition that the user prefers while using the second mode of transportation.

13. The computing system of claim 11, wherein the at least one module is further operable by the at least one processor to:

determine respective amounts of energy predicted to be expended by the user of the computing device while using each of the two or more modes of transportation available to the user to travel from the location of the computing device to the particular destination, wherein the first recommended mode of transportation is further determined based at least in part on the respective amount of energy associated with each of the two or more modes of transportation.

14. The computing system of claim 13, wherein the at least one module is further operable by the at least one processor to determine the first recommended mode of transportation in response to determining that the respective amount of energy associated with the first recommended mode of transportation exceeds the respective amount of energy associated with the second recommended mode of transportation.

15. The computing system of claim 13, wherein the at least one module is further operable by the at least one processor to determine the first recommended mode of transportation in response to determining that the respective amount of energy associated with the first recommended mode of transportation is less than the respective amount of energy associated with the second recommended mode of transportation.

16. The computing system of claim 11, wherein the at least one module is further operable by the at least one processor to determine the first recommended mode of transportation by at least obtaining weather or traffic information associated with the expected travel route, wherein the first recommended mode of transportation is determined based at least in part on a weather forecast or a traffic condition associated with the weather or traffic information.

17. A non-transitory computer readable storage medium comprising instructions that, when executed, configure at least one processor of a computing device to:

send, to a computing system, an indication of a current location of the computing device and movement associated with the computing device;

receive, from the computing system, an indication of a first recommended mode of transportation from two or more modes of transportation available to the user of the computing device to travel along an expected travel route from the current location of the computing device to a particular destination, wherein use of the first recommended mode of transportation is predicted to aid the user of the computing device in achieving a fitness goal associated with the user that has been determined based on the movement associated with the computing device;

output, for display, an indication of the first recommended mode of transportation;

receive, from the computing system, an indication of a second recommended mode of transportation from the two or more modes of transportation, wherein:

the second recommended mode of transportation is different from the first recommended mode of transportation;

use of the second recommended mode of transportation is predicted to aid the user in achieving the fitness goal, and the second recommended mode of transportation is received in response to a change in weather information detected by the computing system along the expected travel route; and output, for display, an indication of the second recommended mode of transportation.

18. The non-transitory computer readable storage medium of claim 17, comprising additional instructions that, when executed, configure the at least one processor of the computing device to receive the second recommended mode of transportation in response to a change in traffic information detected by the computing system.

19. The non-transitory computer readable storage medium of claim 17, comprising additional instructions that, when executed, configure the at least one processor of the computing device to send, to the computing system, communication information associated with the user of the computing device, wherein a portion of the communication information includes data indicative of at least one mode of transportation from the two or more modes of transportation available to the user, wherein the communication information comprises at least one of calendar information, e-mail message information, text-based message information, voicemail message information, or social media network information, wherein the first recommended mode of transportation is further received based at least in part on the data indicative of the at least one mode of transportation from the two or more modes of transportation available to the user.

20. The method of claim 1, wherein the indication of the first recommended mode of transportation is output for display by the computing device in response to determining that a current time coincides with a departure time that the user is predicted to need to begin traveling using the first mode of transportation to arrive at the destination by the future time.

* * * * *